(12) United States Patent
Malam

(10) Patent No.: US 12,546,945 B2
(45) Date of Patent: Feb. 10, 2026

(54) OPTICAL DEVICE ASSEMBLY AND METHOD OF MANUFACTURING SAME

(71) Applicant: HUAWEI TECHNOLOGIES CO., LTD., Shenzhen (CN)

(72) Inventor: Anver Malam, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 317 days.

(21) Appl. No.: 18/376,271

(22) Filed: Oct. 3, 2023

(65) Prior Publication Data
US 2025/0110282 A1 Apr. 3, 2025

(51) Int. Cl.
*G02B 6/32* (2006.01)
*G02B 6/42* (2006.01)

(52) U.S. Cl.
CPC ............ *G02B 6/32* (2013.01); *G02B 6/423* (2013.01); *G02B 6/4244* (2013.01); *G02B 6/4239* (2013.01)

(58) Field of Classification Search
None
See application file for complete search history.

(56) References Cited

U.S. PATENT DOCUMENTS

| | | | |
|---|---|---|---|
| 11,543,588 B2 | 1/2023 | Ring et al. | |
| 2017/0242208 A1* | 8/2017 | Lee | G02B 6/424 |
| 2018/0024303 A1 | 1/2018 | Nakanishi | |
| 2021/0384700 A1 | 12/2021 | Caer et al. | |
| 2022/0057578 A1 | 2/2022 | Endo et al. | |
| 2022/0057580 A1 | 2/2022 | Endo et al. | |
| 2023/0092060 A1 | 3/2023 | Moret et al. | |
| 2023/0095039 A1 | 3/2023 | Nekkanty et al. | |

* cited by examiner

*Primary Examiner* — Richard H Kim (57) ABSTRACT

An optical device (OD), a semiconductor wafer structure (SWS) and a method of making the same are provided. The OD has a first semiconductor member (FSM), a second semiconductor member (SSM) and an OD mount. The OD mount has an optical component whose function is to receive an optical beam (OB) from a source and provide the OB to a destination. A portion of the OD mount is held in a cavity defined by the FSM and the SSM. The OD mount is fixedly secured to the FSM and to the SSM. The FSM and the SSM are also fixedly secured to each other. The OD may be integrated in opto-electrical device. Having the support portion of the OD mount held in place in the cavity minimizes movement of OD mount during operation of the OE device, thereby minimizing movement of the optical beam. The SWS comprises multiples instances of the OD. Manufacturing the SWS is achieved using passive optical alignment.

19 Claims, 10 Drawing Sheets

OPTICAL DEVICE ASSEMBLY AND METHOD OF MANUFACTURING SAME

CROSS-REFERENCE TO RELATED APPLICATIONS

This is the first application filed for the present invention.

FIELD OF THE INVENTION

The present disclosure relates to the field of semiconductor devices and in particular to semiconductor optical devices and methods of making the same.

BACKGROUND

The fabrication of semiconductor optical devices such as silicon photonic devices often requires precise alignment of optical components (e.g., lenses) whose purpose is to direct light from a source (e.g., optical fiber array), to a destination (e.g., array of waveguides formed in an electro-optical integrated circuit). The presence of multiple fibers, waveguides and lenses, as well stringent manufacturing tolerance often requires active alignment, which is time and resources consuming. Moreover, the securing in place of the lenses with respect to the fibers and waveguides when optical alignment is attained may be difficult to achieve and unreliable over time.

Therefore, improvements in the fabrication of optical devices are desirable.

This background information is provided to reveal information believed by the applicant to be of possible relevance to the present invention. No admission is necessarily intended, nor should be construed, that any of the preceding information constitutes prior art against the present invention.

SUMMARY

In a first aspect, the present disclosure provides an optical device that comprises a first semiconductor member (FSM) that has a first side and a second side, with the second side being opposite the first side. The FSM defines a through aperture extending from the first side to the second side. The through aperture defines a first aperture contour at the first side and a second aperture contour at the second side. The through aperture has an overcut portion defined by wall surfaces extending away from the first aperture contour toward the second side. The through aperture also has a seat portion connected to the overcut portion, and defined by ledge surfaces extending away from the wall surfaces in a direction parallel to the second side; and joining surfaces extending from the second aperture contour toward the first side and joining the ledge surfaces to the second side. The optical device also comprises an optical device (OD) mount that has OD support portion and an OD holder portion connected to the OD support section. The OD support portion is seated in the seat portion of the first semiconductor member. The OD holder portion protrudes out of the second side of the first semiconductor member. The optical device further comprises a second semiconductor member (SSM) having a first side and a second side, with the second side being opposite the first side. The second side of the SSM is secured to the first side of the FSM; spaced apart from the OD support portion of the lens mount; and secured to the OD support portion of the lens mount.

In some embodiments, the optical device may comprise an adhesive securing the second side of the SSM to the first side of the FSM.

In some embodiments, the SSM may define a through hole overlapping the OD support portion and the through hole may be configured to receive the adhesive during the assembly of the optical device.

In some embodiments, the OD support portion may have a protruding portion that protrudes out of the overcut portion of the through aperture of the FSM; and the SSM may define a pocket that surrounds the protruding portion of the OD support portion.

In some embodiments, at least one ledge surface of the ledge surfaces may join, at an angle different than 0°, a corresponding wall surface of the plurality of wall surfaces of the overcut portion to define a first alignment feature; and the OD support portion may define a second alignment feature that when positioned against the first alignment feature aligns the OD mount with respect to the FSM in a predetermined alignment position.

In some embodiments, the wall surfaces of the overcut portion are slanted walls.

In some embodiments, the optical device may comprise one of a lens, a mirror, a filter, a polarizer, a polarization rotator, a birefringent material and a waveplate mounted in the OD mount.

In a second aspect, the present disclosure provides a semiconductor wafer structure that comprises a first semiconductor wafer (FSW) having a first side and a second side. The second side is opposite the first side. The FSW defines a plurality of through apertures extending from the first side to the second side. Each through aperture of the plurality of through apertures defines a respective first aperture contour at the first side and a respective second aperture contour at the second side. Each through aperture of the plurality of through apertures has a respective overcut portion defined by wall surfaces extending away from the respective first aperture contour toward the second side. Each through aperture also has a respective seat portion connected to the overcut portion. The respective seat portion is defined by respective ledge surfaces extending away from the wall surfaces in a direction parallel to the second side; and respective joining surfaces extending from the respective second aperture contour toward the first side and joining the respective ledge surfaces to the second side. The semiconductor wafer structure also comprises a plurality of optical device (OD) mounts each having an OD support portion and an OD holder portion connected to the OD support section. Each OD mount of the plurality of lens mounts is seated in a respective seat portion of a respective through aperture of the FSW. Each OD holder portion of each respective OD mount protrudes out of the second side of the FSW. The semiconductor wafer structure further comprises a second semiconductor wafer (SSW) that has a first side and a second side, with the second side being opposite the first side, the second side of the SSW is secured to the first side of the FSW; spaced apart from the OD support portion of each OD mount of the plurality of OD mounts seated in a respective seat of a respective through aperture of the FSW; and secured to the support portion of each OD mount of the plurality of OD mounts seated in the respective seat of a respective through aperture of the first semiconductor wafer.

In some embodiments, the semiconductor wafer structure may further comprise an adhesive securing the second side of second semiconductor member to the OD support portion.

In some embodiments, the SSW defines a plurality of through holes each overlapping a respective OD support portion. Each through hole of the plurality of through holes may be configured to receive the adhesive during an assembly of the semiconductor wafer structure.

In some embodiments, the OD support portion of each respective OD mount of the plurality of mounts may have a protruding portion that protrudes out of the overcut portion of a respective through aperture of the plurality of through apertures; and the SSW may define a plurality of pockets and each of which may surround the protruding portion of the OD support portion of a respective OD mount of the plurality of OD mounts.

In some embodiments, for the overcut portion of a respective through aperture of the plurality of through apertures, at least one ledge surface of the ledge surfaces may join, at an angle different than 0°, a corresponding wall surface of the plurality of wall surfaces of the overcut portion to define a first alignment feature; and the OD support portion may define a second alignment feature that when positioned against the first alignment feature aligns the OD mount with respect to the FSW in a predetermined alignment position.

In some embodiments, for the overcut portion of a respective through aperture of the plurality of through apertures, the wall surfaces of the overcut portion may be slanted walls.

In some embodiments, the semiconductor wafer may further comprise, for each OD mount of the plurality of OD mounts, one of a lens, a mirror, a filter, a polarizer, a polarization rotator, a birefringent material and a waveplate mounted in the OD mount.

In a third aspect of the present disclosure, there is provided a method that comprises positioning a first semiconductor wafer (FSW) to receive a plurality of optical device (OD) mounts. The FSM has: a first side and a second side. The second side of the FSW is opposite the first side of the FSW. The FSW defines a plurality of through apertures each extending from the first side to the second side and defining a respective first aperture contour at the first side and a respective second aperture contour at the second side. Each through aperture of the plurality of through apertures has an overcut portion with wall surfaces extending away from the first aperture contour toward the second side; and a seat portion connected to the overcut portion. The seat portion is defined by ledge surfaces extending away from the wall surfaces in a direction parallel to the second side; and joining surfaces extending from the second aperture contour toward the first side and joining the ledge surfaces to the second side. Each OD mount of the plurality of OD mounts has an OD support portion and an OD holder portion connected to the OD support section. The method further comprises placing the plurality of OD mounts into the plurality of through apertures with each respective OD mount of the plurality of OD mounts being placed into a respective through aperture of the plurality of through apertures with the OD support portion of each respective OD mount seated in the seat portion of the respective through aperture, and with the holder portion of the respective OD mount protruding out of the second side of the FSW and out of the respective through aperture. The method additionally comprises securing a second semiconductor wafer (SSW) to the FSW and over the plurality of OD mounts placed into the plurality of through apertures.

In some embodiments of the third aspect, the SSW may have a first side and a second side, the second side of the SSW being opposite the first side of the SSW, and securing the SSW to the FSW and over the plurality of OD mounts placed into the plurality of through apertures may comprise securing the second side of the SSW to the first side of the FSW. The FSW, the SSW and the plurality of OD mounts may be configured for the second side of the SSW to be spaced apart from plurality of OD mounts when the SSW is secured to the FSW.

In some embodiments of the each OD support portion of each respective OD mount of the plurality of OD mounts may have a protruding portion that protrudes out of the respective overcut portion of the FSW; the SSW may define a plurality of pockets; and securing the SSW to the FSW and over the plurality of OD mounts placed into the plurality of through apertures may include positioning a respective pocket of the plurality of pockets over a respective protruding portion of a respective OD support portion.

In some embodiments of the third aspect, each through aperture of the plurality of through apertures may define a respective first alignment feature; each OD support portion of each of OD mount the plurality of OD mounts may define a respective second alignment feature; and placing the plurality of OD mounts into the plurality of through apertures may include aligning the second alignment feature of each OD support portion of each OD mount of the plurality of OD mount with the first alignment feature of the through aperture of the plurality of through apertures in which the respective OD mount is placed.

In some embodiments, the first alignment feature of each through aperture of the plurality of through apertures may be defined by at least one ledge surface of the respective ledge surfaces that may join, at an angle other that 0°, at least one wall surface of respective wall surfaces of the overcut portion to define a respective alignment junction; each OD support portion of each OD mount of the plurality of mounts may have a shape that comprises an OD support portion edge, and the OD support portion edge may be the second alignment feature; The second alignment feature of the OD support portion of each respective OD mount of the plurality of OD mounts is the respective OD support portion edge; and placing the plurality of OD mounts into the plurality of through apertures may include, for each OD mount of the plurality of OD mounts, aligning the respective second alignment feature against the first alignment feature of a respective aperture of the plurality of through apertures.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present disclosure provide a method for manufacturing a semiconductor wafer structure that defines multiple instances of an optical device (OD) that requires precise alignment of an OD mount of the OD relative to other components of the OD. The manufacturing of the semiconductor wafer structure may be done passively; that is, without needing active alignment of the OD mount. The method may rely on the precise fabrication of alignment features in seats defined by a first semiconductor wafer and on the precise fabrication of complementary alignment features defined by the OD mounts. During manufacturing, each OD mount is seated in a respective seat with the alignment feature of the seat aligned with the alignment feature of the OD mount. When aligned, the OD mounts may be secured to their respective seat with an adhesive such as an ultraviolet-sensitive epoxy. A second semiconductor wafer may then be secured to the first semiconductor wafer and to each of the OD mounts to form the semiconductor wafer structure, which may then be subjected to a cutting process to separate each instance of the OD from the other instances of the OD.

Figure 1:
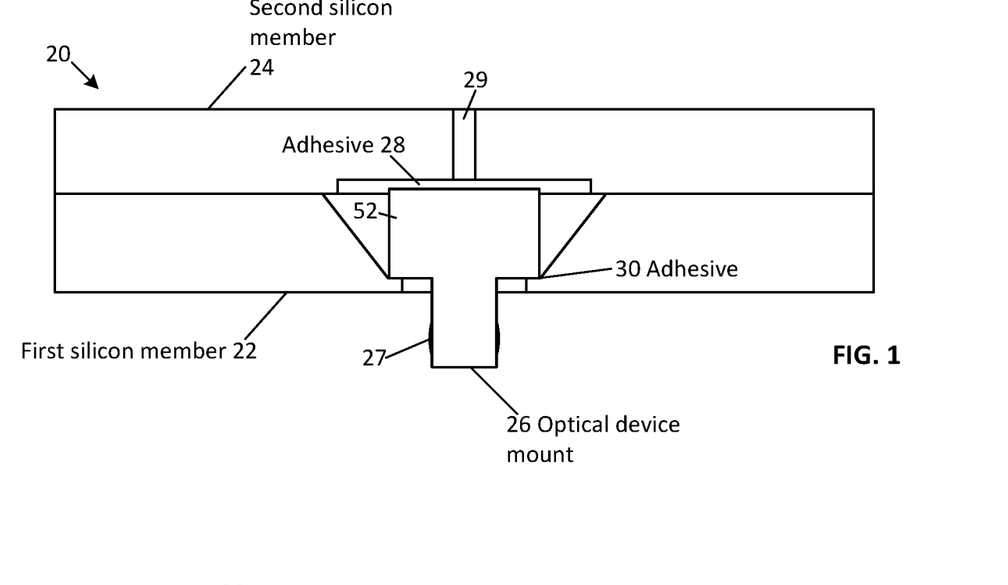
FIG. 1 shows a cutaway, side elevation view of an optical device in accordance with embodiments of the present disclosure.

FIG. 1 shows a cutaway, side elevation view of an optical device 20 in accordance with embodiments of the present disclosure. The OD 20 may include a first semiconductor member (FSM) 22, a second semiconductor member (SSM) 24 and an OD mount 26. The OD mount 26 may have mounted therein one or more than one optical element 27. Non-limiting examples of optical elements may include a lens, a reflector, a filter, a polarizer, a polarization rotator, a birefringent material and a waveplate. The FSM 22 may be secured to the SSM 24 with any suitable type of securing means, such as any suitable adhesive. The SSM 24 may be spaced apart from the OD mount 26 and the space between the SSM 24 and the OD mount 26 may include any suitable type of adhesive 28 to secure the SSM 24 to the OD mount 26. Additionally, any suitable type of adhesive 30, for example an ultraviolet curable epoxy, may be used to secure the OD mount 26 to the FSM 22. The SSM 24 may define a port 29 through which the adhesive 28 may be inserted during manufacturing of the OD 20. The port 29 may overlap the OD mount 26. Having the OD mount 26 sitting in the FSW 22 and secured with an adhesive to the SSM 24, which is itself secured to the FSM 22, may reduce the risk of OD mount 26 moving with respect to the FSM 22 and/or the SSM 24 when in use. In particular, having the OD mount 26 sitting in the FSW 22 and secured with an adhesive to the SSM 24, which is itself secured to the FSM 22, may reduce the risk of OD mount 26 titling, during its operation life, with respect to the FSM 22 and/or the SSM 24, about an axis perpendicular to the plane of the drawing of FIG. 1.

The semiconductor material of the FSM 22 and of the SSM 24 may be include any suitable semiconductor element, such, for example, silicon or any other suitable Group IV element (e.g., Ge, Sn). In some embodiments, the FSM 22 and SSM 24 may comprise semiconductor compounds that may include any suitable Group III elements (e.g., Al, Ga and In) and Group V elements (e.g., As, P, Sb and P). In other embodiments, the FSM 22 and SSM 24 may comprise semiconductor compounds that may include any suitable Group II elements (e.g., Ca and Zn, etc.) and Group VI elements (e.g., Se, S and Te). The OD mount 26 of the embodiment of FIG. 1, and of the other embodiments disclosed herein, may be made of any suitable material, including any suitable semiconductor material.

Figure 2:
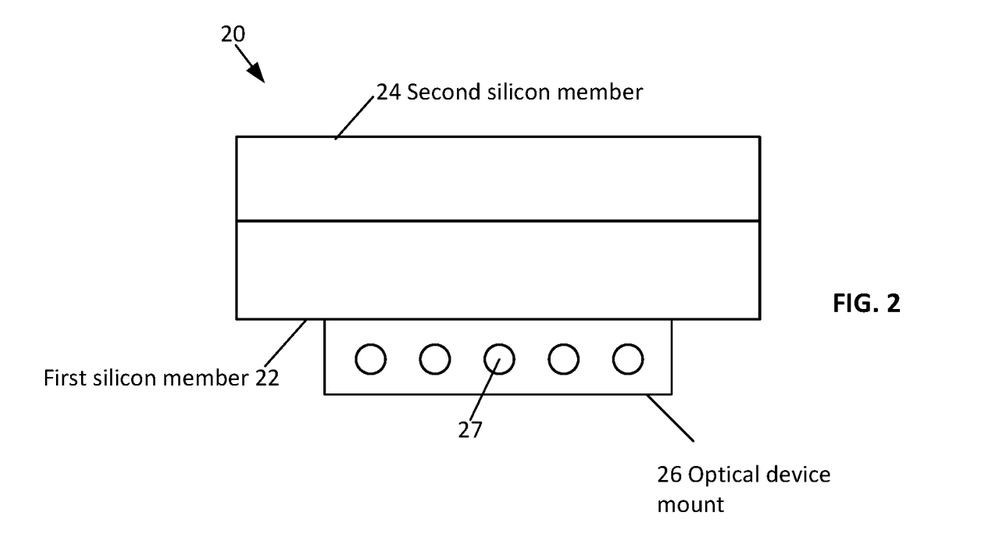
FIG. 2 shows a front elevation view of the optical device embodiment of FIG. 1.

FIG. 2 shows a front elevation view of the OD 20 shown at FIG. 1. In FIG. 2, five optical elements 27 are included in the OD mount 26. In other embodiments, any other number of optical elements 27 may be present.

Figure 3:
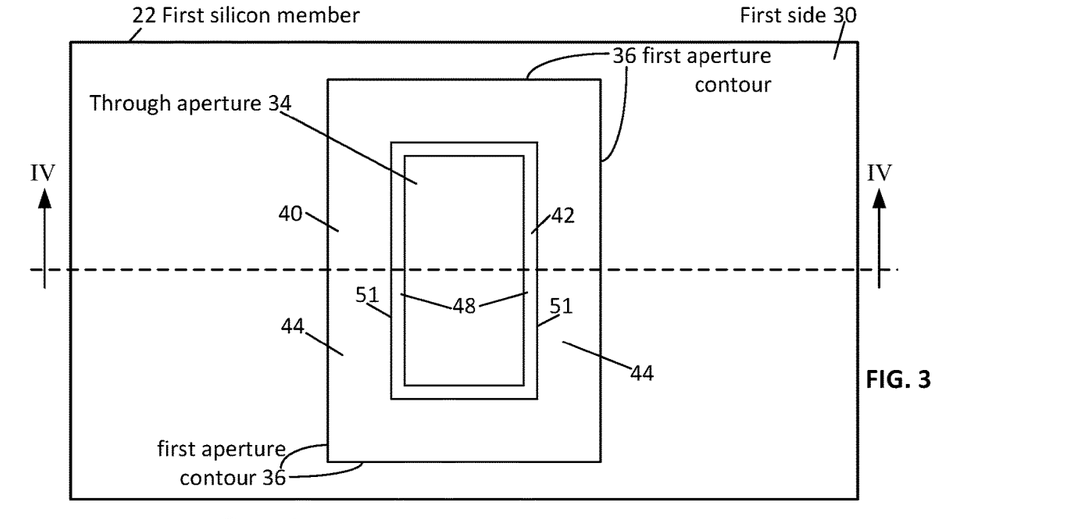
FIG. 3 shows a top view of an embodiment of a first semiconductor member in accordance with the present disclosure.

FIG. 3 shows a top view of an embodiment of the FSM 22 in accordance with the present disclosure.

Figure 4:
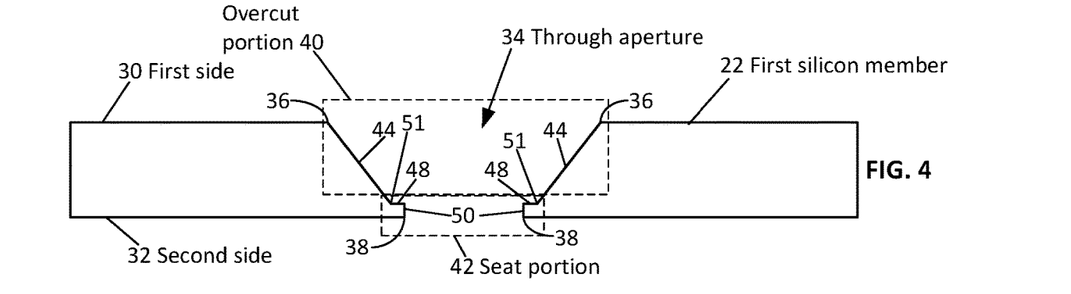
FIG. 4 shows a side cutaway view of the embodiment of the first semiconductor member of FIG. 3.

FIG. 4 shows a side cutaway view of the FSM 22 shown at FIG. 3, taken along the line IV-IV.

Figure 5:
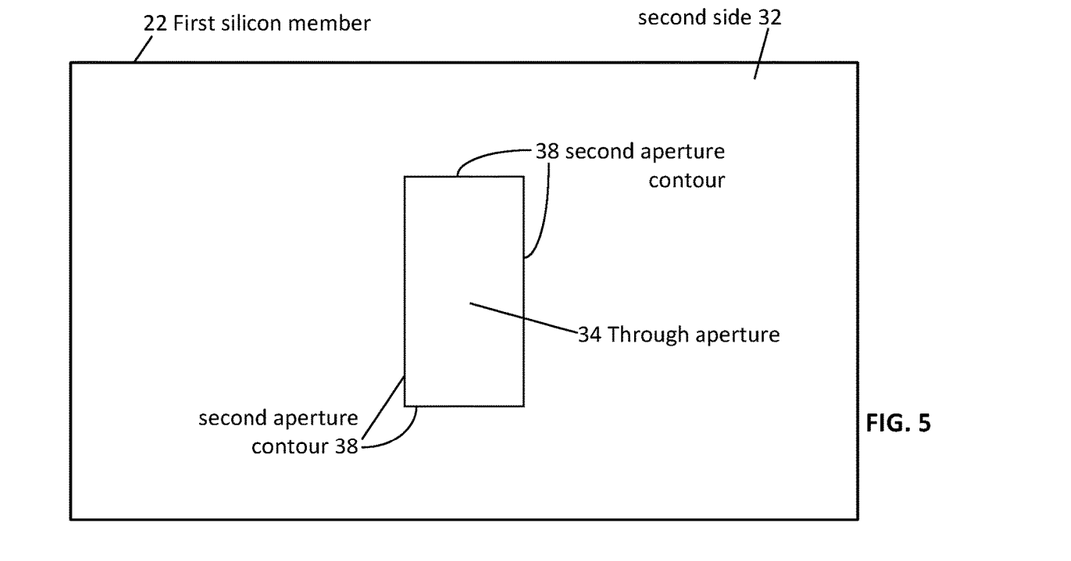
FIG. 5 shows a bottom view of the embodiment of the first semiconductor member of FIG. 3.

FIG. 5 shows a bottom view of the FSM 22.

Referring to FIG. 3, FIG. 4 and FIG. 5, the FSM 22 may have a first side 30 and a second side 32, which is opposite to the first side 30. The FSM 22 may define a through aperture 34 that may extend from the first side 30 to the second side 32. The through aperture 34 may define a first aperture contour 36 at the first side 30, and a second aperture contour 38 at the second side 32. The through aperture 34 may include or may be defined by an overcut portion 40 and a seat portion 42, which may be connected to the overcut portion 40. The overcut portion 40 may be defined by wall surfaces 44 that may extend away from the first aperture contour 36 toward the second side 32. In the present embodiment, the overcut portion 34 and the seat portion 42 are connected to each other by the wall surfaces 44.

The seat portion 42 may be defined by ledge surfaces 48 that may extend away from the wall surfaces 44 in a direction parallel to the second side 32 and by joining surfaces 50 that may extend from the second aperture contour 38 toward the first side 30 and that may connect the ledge surfaces 48 to the second side 32. The intersection of a wall surface 44 with a ledge surface 48, at an angle different from 0°, may define a seat alignment feature 51 with which to align the OD mount 26.

Figure 6:
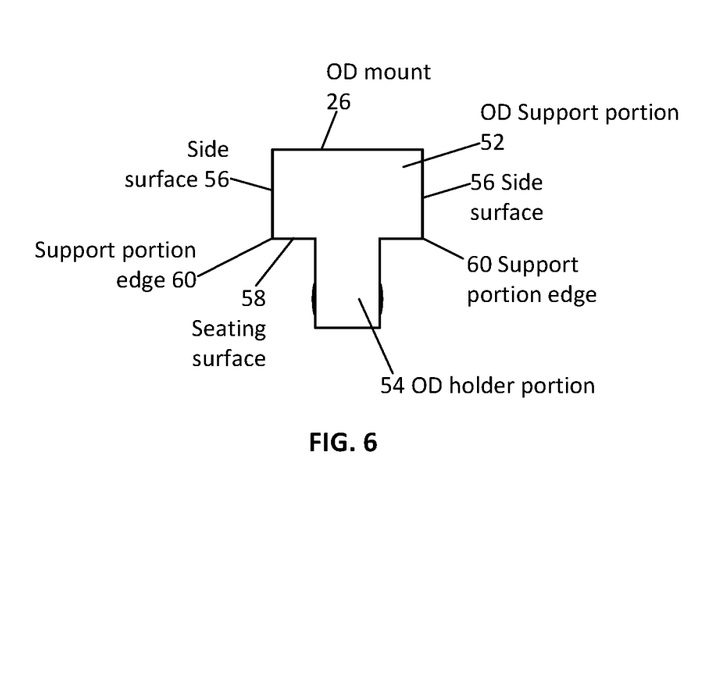
FIG. 6 shows a side elevation view of an embodiment of an optical device mount in accordance with the present disclosure.

FIG. 6 shows a side elevation view of an embodiment of an OD mount 26 in accordance with the present disclosure. The OD mount 26 may include an OD support portion 52, an OD holder portion 54, a side surface 56 and a seating surface 58. The seating surface 58 may be configured to sit in the seat portion 42 of the FSM 22 shown at FIG. 4. In some embodiments, an intersection of the side surface 56 with the seating surface 58 may define a support portion edge 60 which, in some embodiments, may be used as an alignment feature to align the OD mount 26 with the FSM 22, by aligning the support portion edge 60 with the seat alignment feature 51 of the seat portion.

Figure 7:
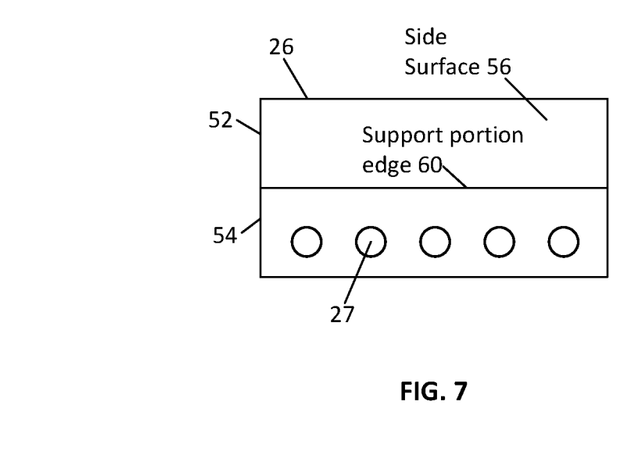
FIG. 7 shows a front elevation view of the embodiment of the optical device mount of FIG. 6.

FIG. 7 shows a front elevation view of the OD mount of FIG. 6.

Figure 8:
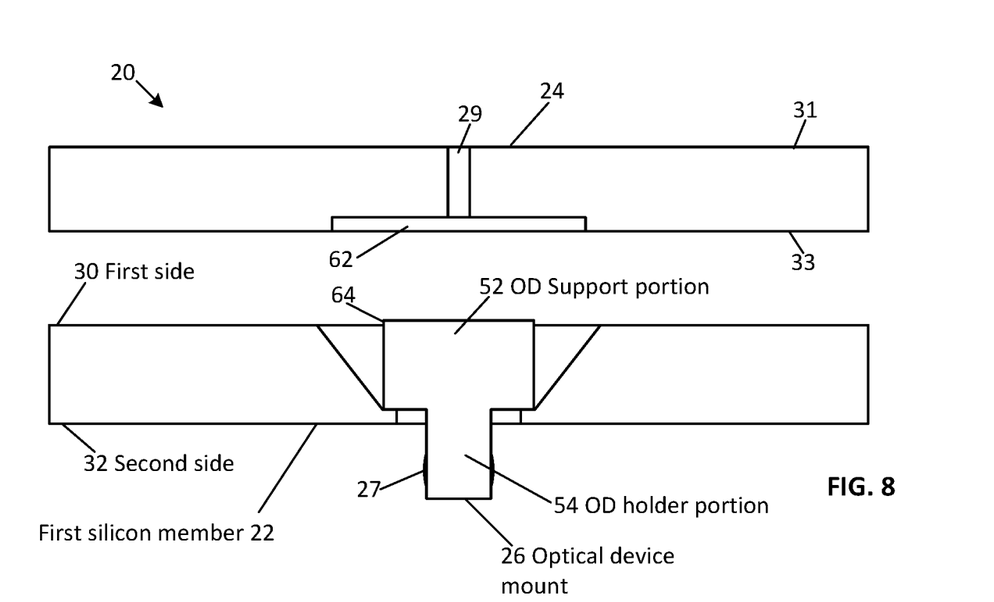
FIG. 8 shows an exploded side elevation view of an embodiment of an optical device in accordance with the present disclosure.

FIG. 8, shows an exploded side view an embodiment of an OD 20 in accordance with the present disclosure. The embodiment of FIG. 8 is similar to the embodiment of FIG. 1 but is shown with the SSM 24 separated from the FSM 22. FIG. 8 shows that the OD holder portion 54 of the OD 26 may protrude out from the second side 32 of the of the FSM 22 and the OD support portion 52 may protrude out from the first side 30 of the FSM 22, i.e., extend beyond the first side 30. In this embodiment, the SSM 24, which has a first side 31 and a second side 33, may define a pocket 62 that may surround the portion of the OD support portion 52 that protrudes out of the first side 30 of the FSM 22 and spaces apart the SSM 24 from the OD support portion 52, when the SSM 24 is secured to the FSM 22.

Figure 9:
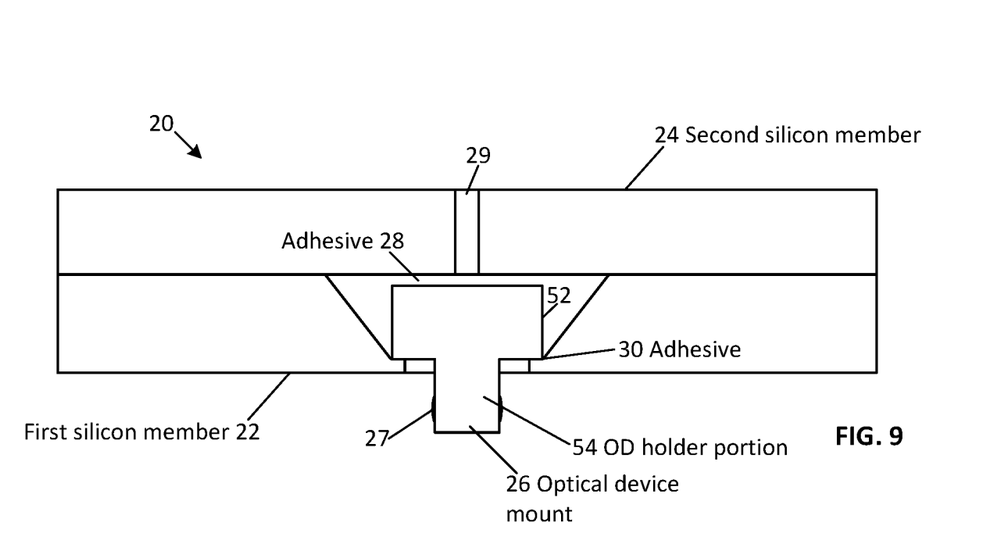
FIG. 9 shows a side elevation view of an embodiment of an optical device in accordance with the present disclosure.

FIG. 9 shows a side elevation view of another embodiment of an OD 20 in accordance with the present disclosure. The OD 20 includes a FSM 22, an OD mount 26 and a SSM 24. In the present embodiment, the OD support portion 52 does not protrude out of the first side 30 of the FSM 22 and the SSM 24 does not need to define a pocket to surround the portion of the OD support portion 52 since the OD support portion 52 does not protrude out of the first side 30 of the FSM 22. In the embodiment of FIG. 9, the height of the OD support portion 52 is such that when the SSM 24 is secured to the FSM 22, a gap remains between the SSM 24 and the OD support portion 52. The adhesive 28 securing the SSM 22 to the OD support portion 52 may be provided by the port 29.

Figure 10:
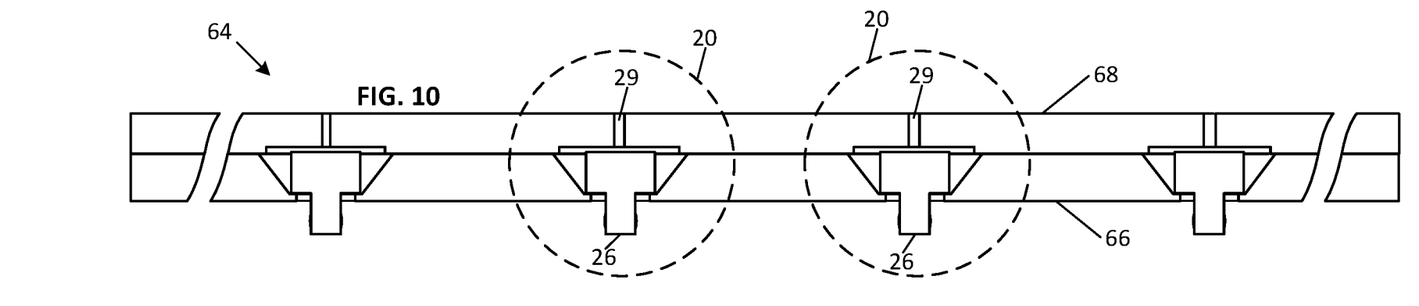
FIG. 10 shows a side elevation cutaway view of an embodiment of a wafer structure in accordance with an embodiment of the present disclosure.
Figure 11:
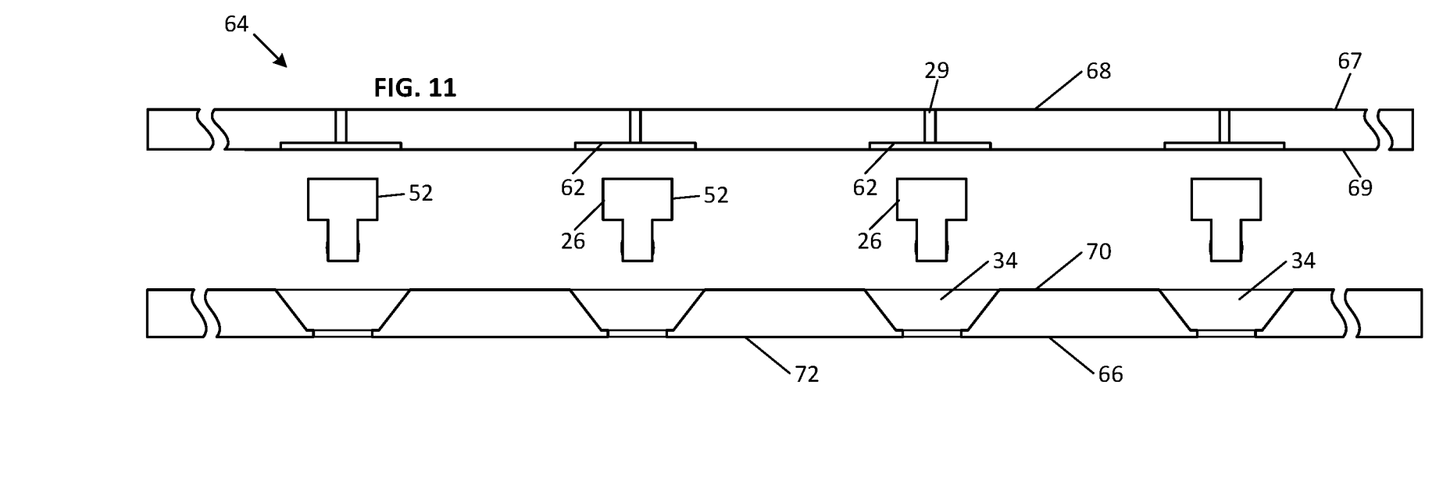
FIG. 11 shows an exploded side elevation cutaway view of the embodiment of the wafer structure of FIG. 10.

FIG. 10 shows a side elevation cutaway view of an embodiment of a wafer structure 64 in accordance with an embodiment of the present disclosure. FIG. 11 shows an exploded side elevation cutaway view of the embodiment of the wafer structure 64 shown in FIG. 10.

Referring to FIG. 10 and FIG. 11, the wafer structure 64 may include a first semiconductor wafer (FSW) 66, a second semiconductor wafer (SSW) 68, and a plurality of OD mounts 26. The FSW 66 may define a plurality of through apertures 34 extending from a first side 70 of the FSW 66 to a second side 72 of the FSW 66. Each through aperture 34 of the wafer structure 64 may have the same the same physical characteristics as the through aperture 34 disclosed in relation to the embodiments of FIGS. 3, 4 and 5. The SSW 68 may include a first side 67 and a second side 69.

Still referring to FIG. 10 and FIG. 11, each OD mount 26 may have the same characteristics as the OD 26 disclosed in relation to the embodiments shown in FIGS. 1, 2, 6, 7, 8 and 9. The SSW 68 may define a plurality of ports 29 through which an adhesive 28 may be inserted during manufacturing of the wafer structure 64. Each port 29 may overlap the OD support portion 52 of a corresponding OD mount 26. The SSW 68 may define a plurality of pockets 62 that may surround the portion of the OD support portion 52 that protrudes out of the first side 30 of the FSW 66 and spaces apart the SSW 68 from the OD support portion 52, when the SSW 68 is secured to the FSW 66.

The semiconductor material of the FSW 66 and of the SSW 68 may be include any suitable semiconductor element, such as, for example, silicon or any other suitable Group IV element (e.g., Ge, Sn). In some embodiments, the FSW 66 and of the SSW 68 may comprise semiconductor compounds made that include any suitable Group III elements (e.g., Al, Ga and In) and Group V elements (e.g., As, P, Sb and P). In other embodiments, the FSW 66 and of the SSW 68 may comprise semiconductor compounds that include any suitable Group II elements (e.g., Ca and Zn, etc.) and Group VI elements (e.g., Se, S and Te).

Figure 12:
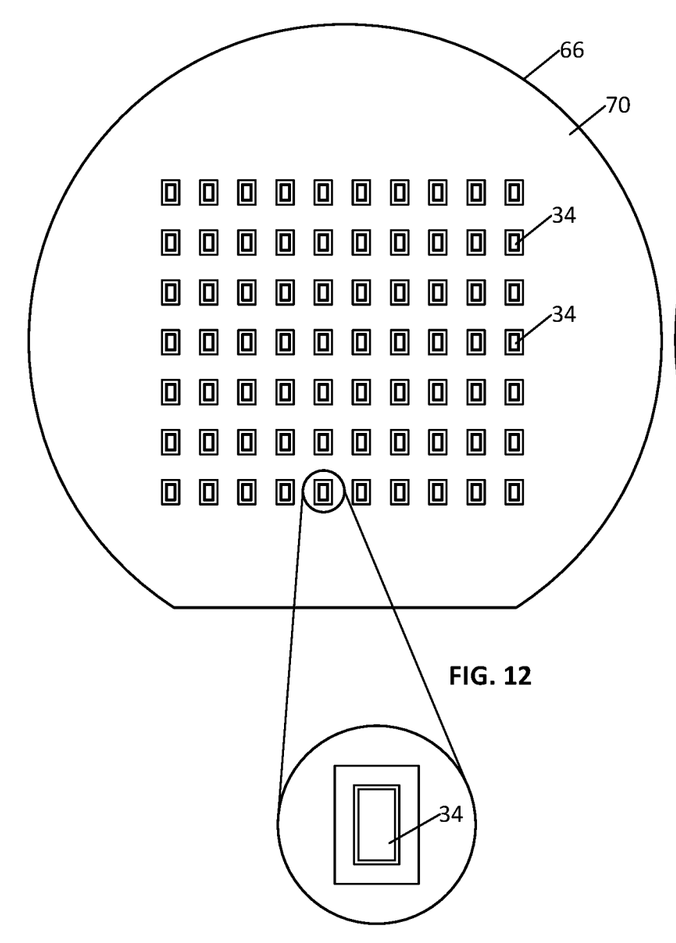
FIG. 12 shows a top view of an embodiment of a first semiconductor waver in accordance with the present disclosure.

FIG. 12 shows a top view of an embodiment of the FSW 66 in accordance with the present disclosure. Shown in FIG. 12 is the first side 70 of the FSW 66 and a plurality of through apertures 34 defined by the FSW 66.

Figure 13:
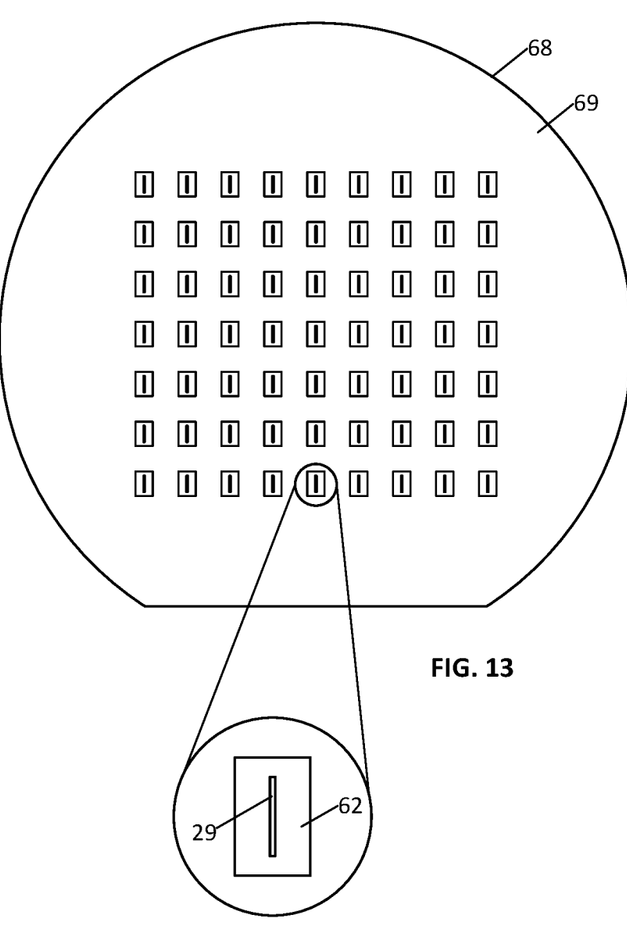
FIG. 13 shows a bottom view of an embodiment of a second semiconductor wafer in accordance with the present disclosure.

FIG. 13 shows a bottom view of an embodiment of the SSW 68 in accordance with the present disclosure. Shown in FIG. 13 is the second side 69 of the SSW 68. The SSW 68 defines a plurality of pockets 62 and a plurality of ports 29.

As will be understood by the skilled worker, the through apertures 34 in the FSW 66 and the ports 29 and the pockets 62 may be fabricated in accordance with any suitable microfabrication process, which may include etching (e.g., potassium hydroxide wet etching, anisotropic potassium chloride wet etching and deep reactive ion etching), greyscale lithography, etc. As will be appreciated by the skilled worker, the microfabrication processes and any chemicals associated thereto may vary depending on the semiconductor material comprised in the FSW 66 and the SSW 68.

The OD mounts may be fabricated using any suitable material such as, for example, a semiconductor material (e.g., silicon), fused silica, or a specialized polymer.

Embodiments of wafer structures in accordance with the present disclosure, for example, the wafer structure 64 embodiment shown at FIG. 10, result in a wafer structure that defines a plurality of OD devices such as, for example, the OD devices 20 shown at FIG. 10. Embodiments of wafer structures in accordance with the present disclosure may be manufactured by placing each of a plurality of OD mounts 26 in a respective through aperture 34 of the FSW 66. Any suitable type of pick and place machine may be used to place the OD mounts 26 in the through apertures 34. In some embodiments, the pick and place machine may be configured to align an alignment feature of an OD mount 26 with an alignment feature of a respective through aperture 34. For example, a pick and place machine may be configured to align a support portion edge 60 (FIG. 6) with a seat alignment feature 51 (FIG. 4). Referring to FIG. 4, in some embodiments, prior to placing the OD mounts 26 in the through apertures, any suitable adhesive dispenser may be used to dispense an adhesive on one or more than one ledge surface 48 of the seat portion 42 of the through apertures 34. In embodiments where a UV curable adhesive is used, a UV light source may be used to cure the UV curable adhesive to secure the OD mounts 26 in their respective seat portions 42.

In some embodiments, subsequent to the placement of the OD mounts 26 in the through apertures 34, the SSW 68 may be secured to the FSW 66 by applying any suitable epoxy on the first side 70 of the FSW 66 or on the second side 69 of the SSW or, on the first side 70 of the FSW 66 and on the second side 69. With the epoxy applied, the first side 70 of the FSW 66 and the second side 69 of the SSW 68 are moved toward each other and pushed against each other to secure the FSW 66 to the SSW 68.

In some embodiments, any suitable adhesive may be introduced into the ports 29 and allowed to flow onto the respective OD support portion 52, in an amount sufficient fill a gap between the OD support portion 52 and the second side 69 of the SSW 68. Subsequent curing of this adhesive, the adhesive may form an adhesive bridge that secures the support portion 52 to the second side 69 of the SSW 68.

After the securing to each other FSW 66, the SSW 68, and the OD mounts, the plurality of OD defined by wafer structure 64 may be separated from each other through any suitable process that may use any suitable dicing, cutting or cleaving machine.

Figure 14:
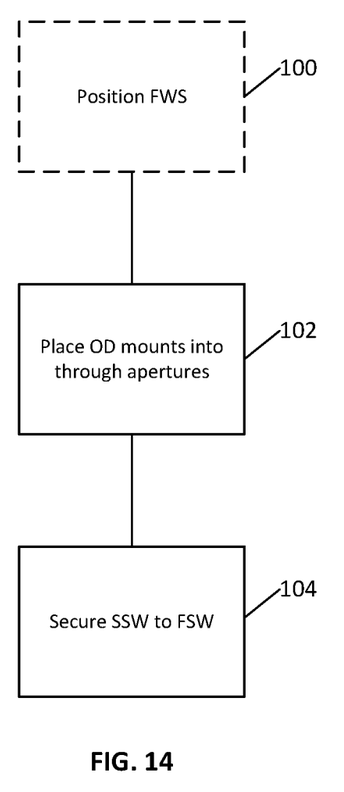
FIG. 14 shows a flowchart of an embodiment of a method in accordance with the present disclosure.

FIG. 14 shows a flowchart of an embodiment of a method in accordance with the present disclosure. At action 100, which may be optional, a FSW may be positioned to receive a plurality of OD mounts. In some embodiments, the FSW may have a first side and a second side, the second side of the FSW being opposite the first side of the FSW. The FSW may defining a plurality of through apertures each extending from the first side to the second side and defining a respective first aperture contour at the first side and a respective second aperture contour at the second side. Each through aperture of the plurality of through apertures may be defined by an overcut portion with wall surfaces extending away from the first aperture contour toward the second side and a seat portion connected to the overcut portion. The seat portion may be defined by ledge surfaces extending away from the wall surfaces in a direction parallel to the second side; and by joining surfaces extending from the second aperture contour toward the first side and joining the ledge surfaces to the second side. Each OD mount of the plurality of OD mounts may have an OD support portion and an OD holder portion connected to the OD support section.

At action 102, the OD mounts may be placed into the plurality of through apertures. Each respective OD mount of the plurality of OD mounts may be placed into a respective through aperture of the plurality of through apertures with the OD support portion of each respective OD mount seated in the seat portion of the respective through aperture, and with the holder portion of the respective OD mount protruding out of the second side of the FSW and out of the respective through aperture.

At action 104, a SSW may be secured to the FSW and over the plurality of OD mounts placed into the plurality of through apertures.

The SSW may have a first side and a second side with the second side of the SSW being opposite the first side of the SSW. Securing the SSW to the FSW and over the plurality of OD mounts placed into the plurality of through apertures may comprise securing the second side of the SSW to the first side of the FSW. The FSW, the SSW and the plurality of OD mounts may be configured for the second side of the SSW to be spaced apart from plurality of OD mounts when the SSW is secured to the FSW.

Each OD support portion of each respective OD mount of the plurality of OD mounts may have a protruding portion that protrudes out of the respective overcut portion of the FSW. The SSW may define a plurality of pockets. Securing the SSW to the FSW and over the plurality of OD mounts placed into the plurality of through apertures may include positioning a respective pocket of the plurality of pockets over a respective protruding portion of a respective OD support portion.

Each through aperture of the plurality of through apertures may define a respective first alignment feature. Each OD support portion of each of OD mount the plurality of OD mounts may define a respective second alignment feature. Placing the plurality of OD mounts into the plurality of through apertures may include aligning the second alignment feature of each OD support portion of each OD mount of the plurality of OD mount with the first alignment feature of the through aperture of the plurality of through apertures in which the respective OD mount is placed.

The first alignment feature of each through aperture of the plurality of through apertures may be defined by at least one ledge surface of the respective ledge surfaces joining, at an angle other that 0°, at least one wall surface of respective wall surfaces of the overcut portion to define a respective alignment junction. Each OD support portion of each OD mount of the plurality of mounts may have a shape that may comprise an OD support portion edge. The OD support portion edge may be the second alignment feature. The second alignment feature of the OD support portion of each respective OD mount of the plurality of OD mounts may be the respective OD support portion edge. Placing the plurality of OD mounts into the plurality of through apertures may include, for each OD mount of the plurality of OD mounts, aligning the respective second alignment feature against the first alignment feature of a respective aperture of the plurality of through apertures.

In some embodiments in accordance with the present disclosure, the OD described herein may be used in fabrication a variety of electro-optical modules, such as, for example, transceivers.

Figure 15:
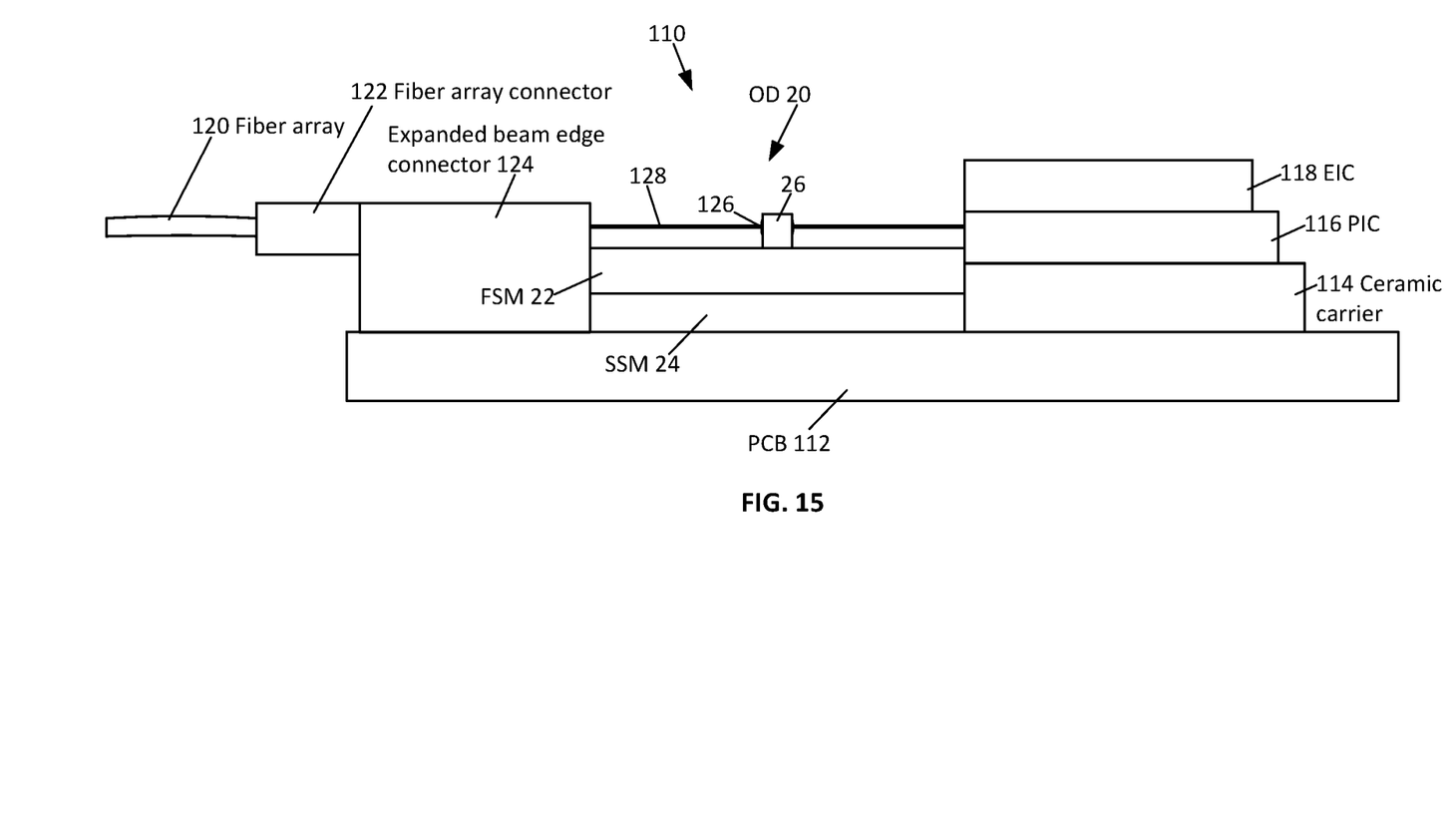
FIG. 15 shows an embodiment of transceiver in accordance with the present disclosure.

FIG. 15 shows an embodiment of a transceiver 110 in accordance with present disclosure. The transceiver 110 may include a printed circuit board (PCB) 112 and a ceramic carrier 114 for RF/DC signals. The ceramic carrier 112 may be physically secured to and electrically connected the PCB 112. The transceiver 110 may also include a photonics integrated circuit (PIC) 116 coupled to the ceramic carrier 114 and an electrical integrated circuit (EIC) 118 coupled to the PIC 116. The PIC 116 may include a plurality of waveguides.

The transceiver 110 may also include a fiber array 120 that may have a fiber array connector 120. The transceiver 110 may further have an expanded beam edge connector 124 secured to the PCB 112 and optically coupled to the fiber array 120 through the fiber array connector 122. The transceiver 110 may have an embodiment of the OD 20 described herein. The OD 20 may include one lens 126 or more than one lens mounted in the OD mount 26 and may be secured to the PCB 112 and positioned to receive light 128 from the expanded beam edge connector 124 and to provide the light 128 to the PIC 116 (e.g., provide the light to one or a plurality of waveguides defined by the PIC 116). The OD 20 may also include a FSM 22 and a SSM 24.

Figure 16:
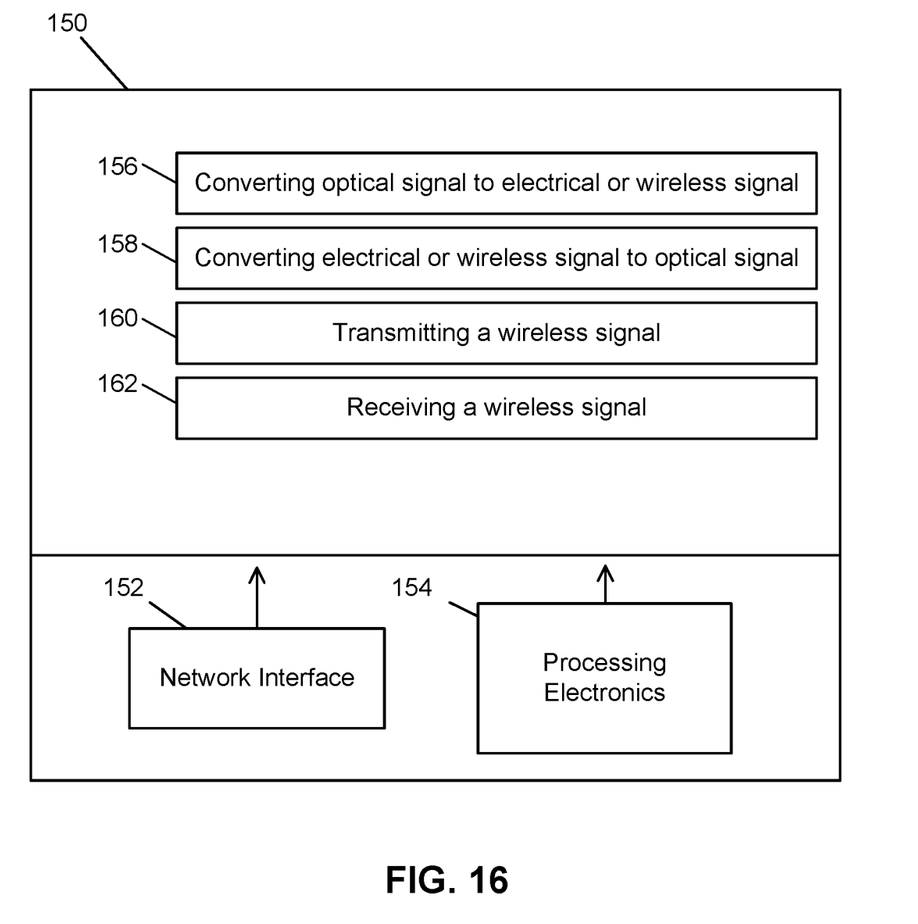
FIG. 16 shows a block diagram an embodiment of an apparatus for implementing, at least partly, an opto-electronic function in accordance with the present disclosure.

FIG. 16 shows a block diagram of an embodiment of an apparatus 150 for implementing, at least partly, an opto-electronic function in accordance with the present disclosure. The opto-electronic function may include the coupling of an optical signal between an optical signal source and an optical signal destination. The optical signal source may be, for example, a laser, a light emitting diode, an output of an optical fiber, etc. The optical signal destination may be, for example, a photodetector, a photodiode, an optical waveguide, etc. The opto-electronic function may include a conversion of an optical signal to an electric signal or to a wireless signal such as, for example, a radio frequency signal, a Wi-Fi signal, etc.

The apparatus 150 may, for example, be a part of the transceiver 110 shown at FIG. 15. The apparatus 150 may include a network interface 152 and processing electronics 154. The processing electronics 154 may include a computer processor executing program instructions stored in memory, or other electronics components such as digital circuitry, including, for example, FPGAs and ASICs. The network interface 152 may include an optical communication interface or radio communication interface, such as a transmitter and receiver. The apparatus 150 may include several functional components, each of which may be partially or fully implemented using the underlying network interface 152 and processing electronics 154. Examples of functional components may include modules for converting 156 an optical signal into an electrical signal or a wireless signal, converting 158 an electrical or wireless signal into an optical signal, transmitting 160 a wireless signal, and receiving 162 a wireless signal.

Figure 17:
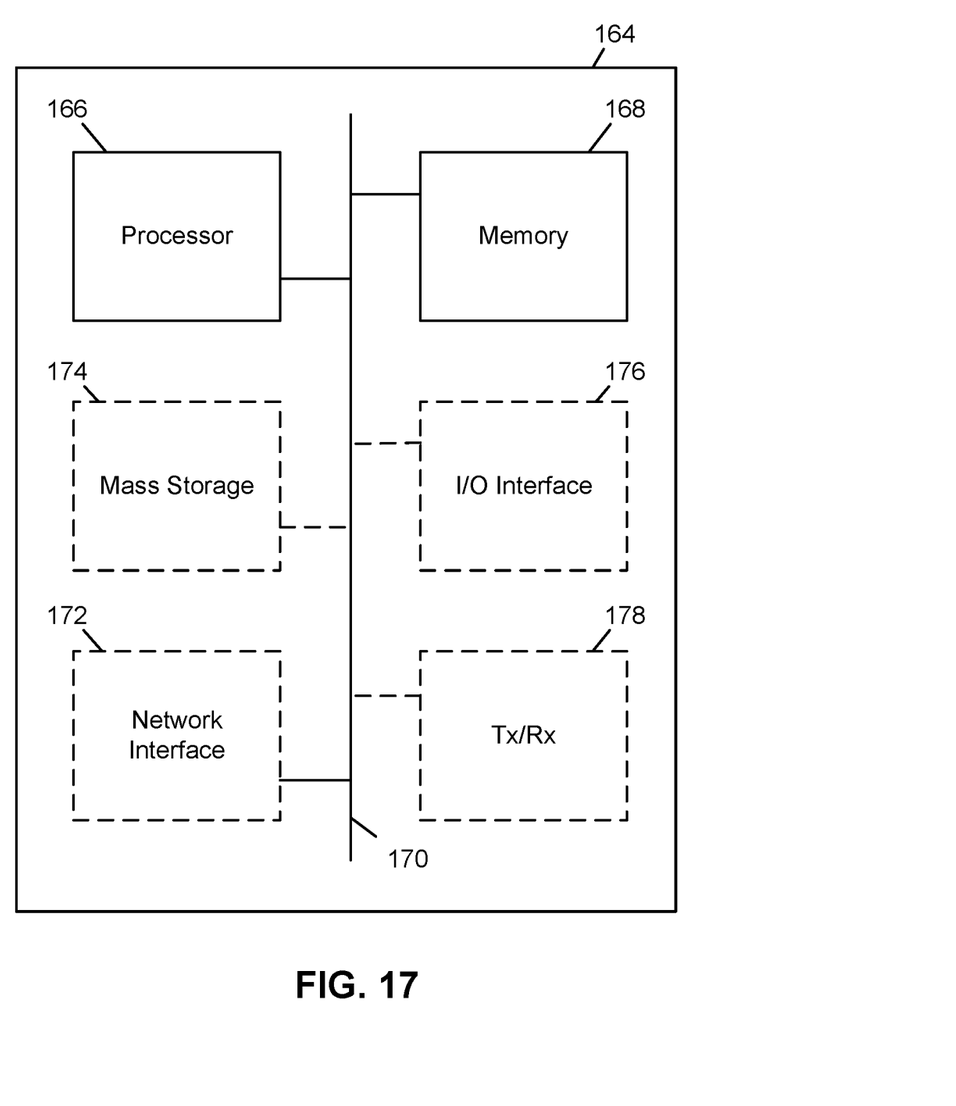
FIG. 17 shows a block diagram of an embodiment of a device in accordance with the present disclosure.

FIG. 17 shows a block diagram of an embodiment of an electronic device 164 that may perform any of the operations related to an opto-electronic function as described herein, according to different embodiments of the present disclosure. For example, the EIC 118 of the transceiver 110 may be configured as the electronic device 164.

As shown, the electronic device 164 includes a processor 166, such as a Central Processing Unit (CPU) or specialized processors such as a Graphics Processing Unit (GPU) or other such processor unit, memory 168, and a bi-directional bus 170 to communicatively couple the components of electronic device 164. Electronic device 164 may also optionally include a network interface 172, non-transitory mass storage 174, an I/O interface 176, and a wireless or radio frequency transceiver unit 178. According to certain embodiments, any or all of the depicted elements may be utilized, or only a subset of the elements. Furthermore, the electronic device 164 may contain multiple instances of certain elements, such as multiple processors, memories, or transceivers. In addition, elements of the hardware device may be directly coupled to other elements without the bi-directional bus. Additionally, or alternatively to the processor 166 and memory 168, other electronics, such as integrated circuits, may be employed for performing the required logical operations.

As used herein, the term "about" should be read as including variation from the nominal value, for example, a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Although a combination of features is shown in the illustrated embodiments, not all of them need to be combined to realize the benefits of various embodiments of this disclosure. In other words, a system or method designed according to an embodiment of this disclosure will not necessarily include all features shown in any one of the Figures or all portions schematically shown in the Figures. Moreover, selected features of one example embodiment may be combined with selected features of other example embodiments.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, as used herein, the terms coupled, coupling, or connected can indicate that two elements or devices are directly connected to one another or connected to one another through one or more intermediate elements or devices via a mechanical element depending on the particular context. The term "and/or" herein when used in association with a list of items means any one or more of the items comprising that list.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. An optical device, comprising:
   a first semiconductor member (FSM) having a first side and a second side, the second side being opposite the first side, the FSM defining a through aperture extending from the first side to the second side, the through aperture defining a first aperture contour at the first side and a second aperture contour at the second side, the through aperture having:
      an overcut portion defined by wall surfaces extending away from the first aperture contour toward the second side; and
      a seat portion connected to the overcut portion, the seat portion defined by:
         ledge surfaces extending away from the wall surfaces in a direction parallel to the second side; and
         joining surfaces extending from the second aperture contour toward the first side and joining the ledge surfaces to the second side;
   an optical device (OD) mount having an OD support portion and an OD holder portion connected to the OD support section, the OD support portion being seated in the seat portion of the first semiconductor member, the OD holder portion protruding out of the second side of the first semiconductor member; and a second semiconductor member (SSM) having a first side and a second side, the second side being opposite the first side, the second side of the SSM being:
secured to the first side of the FSM;
spaced apart from the OD support portion of the lens mount; and
secured to the OD support portion of the lens mount.

2. The optical device of claim 1, further comprising:
an adhesive securing the second side of the SSM to the first side of the FSM.

3. The optical device of claim 2, wherein the SSM defines a through hole overlapping the OD support portion, the through hole configured to receive the adhesive during the assembly of the optical device.

4. The optical device of claim 1, wherein:
the OD support portion has a protruding portion that protrudes out of the overcut portion of the through aperture of the first semiconductor member; and
the SSM defines a pocket that surrounds the protruding portion of the OD support portion.

5. The optical device of claim 1, wherein:
at least one ledge surface of the ledge surfaces joins, at an angle different than 0°, a corresponding wall surface of the plurality of wall surfaces of the overcut portion to define a first alignment feature; and
the OD support portion defines a second alignment feature that when positioned against the first alignment feature aligns the OD mount with respect to the FSM in a predetermined alignment position.

6. The optical device of claim 1, wherein the wall surfaces of the overcut portion are slanted walls.

7. The optical device of claim 1, further comprising one of a lens, a mirror, a filter, a polarizer, a polarization rotator, a birefringent material and a waveplate mounted in the OD mount.

8. A semiconductor wafer structure comprising:
a first semiconductor wafer (FSW) having a first side and a second side, the second side being opposite the first side, the FSW defining a plurality of through apertures extending from the first side to the second side, each through aperture of the plurality of through apertures defining a respective first aperture contour at the first side and a respective second aperture contour at the second side, each through aperture of the plurality of through apertures having:
a respective overcut portion defined by wall surfaces extending away from the respective first aperture contour toward the second side;
a respective seat portion connected to the overcut portion, the respective seat portion defined by:
respective ledge surfaces extending away from the wall surfaces in a direction parallel to the second side; and
respective joining surfaces extending from the respective second aperture contour toward the first side and joining the respective ledge surfaces to the second side;
a plurality of optical device (OD) mounts each having an OD support portion and an OD holder portion connected to the OD support section, each OD mount of the plurality of lens mounts being seated in a respective seat portion of a respective through aperture of the FSW, each OD holder portion of each respective OD mount protruding out of the second side of the first semiconductor wafer; and a second semiconductor wafer (SSW) having a first side and a second side, the second side being opposite the first side, the second side of the SSW being:
secured to the first side of the FSW;
spaced apart from the OD support portion of each OD mount of the plurality of OD mounts seated in a respective seat of a respective through aperture of the FSW; and
secured to the support portion of each OD mount of the plurality of OD mounts seated in the respective seat of a respective through aperture of the first semiconductor wafer.

9. The semiconductor wafer structure of claim 8, further comprising:
an adhesive securing the second side of second semiconductor member to the OD support portion.

10. The semiconductor wafer structure of claim 9, wherein the SSW defines a plurality of through holes each overlapping a respective OD support portion, each through hole of the plurality of through holes configured to receive the adhesive during an assembly of the semiconductor wafer structure.

11. The semiconductor wafer structure of claim 8, wherein:
the OD support portion of each respective OD mount of the plurality of mounts has a protruding portion that protrudes out of the overcut portion of a respective through aperture of the plurality of through apertures; and
the SSW defines a plurality of pockets each of which surrounding the protruding portion of the OD support portion of a respective OD mount of the plurality of OD mounts.

12. The semiconductor wafer structure of claim 8, wherein for the overcut portion of a respective through aperture of the plurality of through apertures:
at least one ledge surface of the ledge surfaces joins, at an angle different than 0°, a corresponding wall surface of the plurality of wall surfaces of the overcut portion to define a first alignment feature; and
the OD support portion defines a second alignment feature that when positioned against the first alignment feature aligns the OD mount with respect to the FSW in a predetermined alignment position.

13. The semiconductor wafer structure of claim 8, wherein for the overcut portion of a respective through aperture of the plurality of through apertures:
the wall surfaces of the overcut portion are slanted walls.

14. The semiconductor wafer structure of claim 8, further comprising, for each OD mount of the plurality of OD mounts, one of a lens, a mirror, a filter, a polarizer, a polarization rotator, a birefringent material and a waveplate mounted in the OD mount.

15. A method, comprising:
positioning a first semiconductor wafer (FSW) to receive a plurality of optical device (OD) mounts, the FSM having:
a first side and a second side, the second side of the FSW being opposite the first side of the FSW, the FSW defining a plurality of through apertures each extending from the first side to the second side and defining a respective first aperture contour at the first side and a respective second aperture contour at the second side, each through aperture of the plurality of through apertures having:

an overcut portion with wall surfaces extending away from the first aperture contour toward the second side;
a seat portion connected to the overcut portion, the seat portion defined by:
ledge surfaces extending away from the wall surfaces in a direction parallel to the second side; and
joining surfaces extending from the second aperture contour toward the first side and joining the ledge surfaces to the second side;
each OD mount of the plurality of OD mounts having an OD support portion and an OD holder portion connected to the OD support section;
placing the plurality of OD mounts into the plurality of through apertures with each respective OD mount of the plurality of OD mounts being placed into a respective through aperture of the plurality of through apertures with the OD support portion of each respective OD mount seated in the seat portion of the respective through aperture, and with the holder portion of the respective OD mount protruding out of the second side of the FSW and out of the respective through aperture;
securing a second semiconductor wafer (SSW) to the FSW and over the plurality of OD mounts placed into the plurality of through apertures.

16. The method of claim 15, wherein:
the SSW has a first side and a second side, the second side of the SSW being opposite the first side of the SSW, and
securing the SSW to the FSW and over the plurality of OD mounts placed into the plurality of through apertures comprises securing the second side of the SSW to the first side of the FSW, the FSW, the SSW and the plurality of OD mounts being configured for the second side of the SSW to be spaced apart from plurality of OD mounts when the SSW is secured to the FSW.

17. The method of claim 16, wherein:
each OD support portion of each respective OD mount of the plurality of OD mounts has a protruding portion that protrudes out of the respective overcut portion of the FSW;
the SSW defines a plurality of pockets; and
securing the SSW to the FSW and over the plurality of OD mounts placed into the plurality of through apertures includes positioning a respective pocket of the plurality of pockets over a respective protruding portion of a respective OD support portion.

18. The method of claim 15, wherein:
each through aperture of the plurality of through apertures defines a respective first alignment feature;
each OD support portion of each of OD mount the plurality of OD mounts defines a respective second alignment feature; and
placing the plurality of OD mounts into the plurality of through apertures includes aligning the second alignment feature of each OD support portion of each OD mount of the plurality of OD mount with the first alignment feature of the through aperture of the plurality of through apertures in which the respective OD mount is placed.

19. The method of claim 18, wherein:
the first alignment feature of each through aperture of the plurality of through apertures is defined by at least one ledge surface of the respective ledge surfaces joining, at an angle other that 0°, at least one wall surface of respective wall surfaces of the overcut portion to define a respective alignment junction;
each OD support portion of each OD mount of the plurality of mounts has a shape that comprises an OD support portion edge, the OD support portion edge being the second alignment feature;
the second alignment feature of the OD support portion of each respective OD mount of the plurality of OD mounts is the respective OD support portion edge; and
placing the plurality of OD mounts into the plurality of through apertures includes, for each OD mount of the plurality of OD mounts, aligning the respective second alignment feature against the first alignment feature of a respective aperture of the plurality of through apertures.

* * * * *